United States Patent [19]

Rath et al.

[11] Patent Number: 5,883,196

[45] Date of Patent: *Mar. 16, 1999

[54] PREPARATION OF POLYALKENYLSUCCINIC ACID DERIVATIVES AND THEIR USE AS FUEL AND LUBRICANT ADDITIVES

[75] Inventors: Hans Peter Rath, Grünstadt; Helmut Mach, Heidelberg, both of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 651,634

[22] Filed: May 22, 1996

[51] Int. Cl.$^6$ .......................... C08F 255/10; C08F 255/00
[52] U.S. Cl. .......................... 525/285; 525/301; 525/303; 525/309
[58] Field of Search ..................................... 525/301, 285, 525/303, 309

[56] References Cited

U.S. PATENT DOCUMENTS

| | | | |
|---|---|---|---|
| 3,342,771 | 9/1967 | Cheritat et al. | 260/41 |
| 3,455,827 | 7/1969 | Mehmedbasich . | |
| 3,476,774 | 11/1969 | Zaweski et al. | 549/255 |
| 3,779,963 | 12/1973 | Ancker et al. | 260/23 |
| 3,953,655 | 4/1976 | Steinkamp et al. | 428/474 |
| 4,086,251 | 4/1978 | Cengel et al. | 549/255 |
| 4,152,499 | 5/1979 | Boerzel et al. . | |
| 4,414,397 | 11/1983 | Powell | 549/255 |
| 4,883,886 | 11/1989 | Huang | 549/255 |
| 5,137,980 | 8/1992 | DeGonia et al. . | |
| 5,319,030 | 6/1994 | Harrison et al. | 525/285 |
| 5,445,657 | 8/1995 | Durand et al. | 525/285 |

FOREIGN PATENT DOCUMENTS

| | | |
|---|---|---|
| 1333596 | 12/1994 | Canada . |
| 168 139 | 1/1986 | European Pat. Off. . |
| 271 937 | 6/1988 | European Pat. Off. . |
| 365 288 | 4/1990 | European Pat. Off. . |
| 584 590 | 3/1994 | European Pat. Off. . |
| 1 299 120 | 8/1962 | Germany . |
| 43 19 672 | 12/1994 | Germany . |
| 1141943 | 2/1969 | United Kingdom . |
| 1329334 | 9/1973 | United Kingdom . |

OTHER PUBLICATIONS

Gabara et al., Journal of Polymer Science: Part A–1, vol. 5, *Grafting in Reaction of Polyethelene and Poly(maleic Anhydride)*, pp. 1539–1545 (1967).

*Primary Examiner*—Donald R. Wilson
*Attorney, Agent, or Firm*—Keil & Weinkauf

[57] ABSTRACT

Polyalkenylsuccinic acid derivatives are prepared by reacting oligo- or polyolefins having a number average molecular weight ($M_N$) of from 500 to 10,000 with maleic acid derivatives I

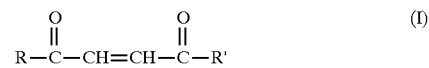

where R and R', independently of one another, are each hydroxyl, lower alkyl or halogen or together are oxygen, at elevated temperatures by a process in which effective amounts of free radical acceptors, such as oxygen, are present in the gas phase and in the liquid phase of the reacting system during the reaction. These polyalkenylsuccinic acid derivatives are suitable, after additional imidation, amidation or esterification, as fuel and lubricant additives.

4 Claims, No Drawings

PREPARATION OF POLYALKENYLSUCCINIC ACID DERIVATIVES AND THEIR USE AS FUEL AND LUBRICANT ADDITIVES

BACKGROUND OF THE INVENTION

1. Field of the Invention

The present invention relates to an improved process for the preparation of polyalkenylsuccinic acid derivatives from oligo- and polyolefins and maleic acid derivatives and their use as fuel and lubricant additives. The present invention furthermore relates to fuels for gasoline engines and lubricants which contain these polyalkenylsuccinic acid derivatives, and ashless dispersants which are cocondensation products based on these polyalkenylsuccinic acid derivatives.

Polyisobutenylsuccinimides are widely used as ashless dispersants in the lubricant sector. They are present in an amount of up to 10% by weight in engine oils for gasoline and diesel engines and are intended here to prevent the agglomeration of particles, which is referred to in general as sludge formation. The dispersing effect, ie. in this case the imparting of water repellent properties to the particles, is therefore their most important property. In fuels, such compounds are used for keeping the intake system, in particular the intake valves, clean. In recent years, there has been an increasing tendency to replace the polyisobutene radical by other oligoolefin radicals. The requirements for these oligoolefin radicals are comparable with those for the polyisobutene radical.

The corresponding imides are generally prepared from polyamines and polyisobutenylsuccinic anhydride (PIBSA) by condensation. The preparation of PIBSA depends essentially on the polyisobutene (PIB) quality and is effected purely thermally (ene reaction), generally at from 225° to 245° C., with yields of about 65%. The yields can be increased to 90% by adding halogens. By an addition reaction with chlorine and dehydrohalogenation or allylchlorination, the double bond of the PIB can be activated and the reaction temperatures thus reduced to about 170° C. However, the addition of chlorine leads in all cases to chlorine-containing compounds, and the combustion thereof in the engine generally leads to toxic dioxins in the exhaust gases.

2. Description of Related Art

According to U.S. Pat. No. 4,152,499 (1), with an increase in the vinylidene content in the PIB, ie. with higher content of reactive terminal double bonds, lower temperatures down to about 170° C. can be realised in the ene reaction even without the use of halogen. According to the examples, however, the maleation of PIB is carried out at 200° C. with a monomolar excess of maleic anhydride (MA) in order to obtain the yields required for marketing. Furthermore, such a type of reaction results in the formation of tar and opaque products which increase the acid and saponification number of the reaction products after removal of unconverted MA and thus simulate high yields.

U.S. Pat. No. 5,137,980 (2) discloses that polyisobutenes having a high vinylidene content give good results with low tar formation, preferably at from 220° to 265° C., with an excess of from 0.1 to 0.9 mol of MA and at from 4 to 50 bar. However, no information is given about the PIB conversion and the bismaleation fraction. In some cases, the reactions are carried out in the presence of catalysts, such as aluminum chloride, which are difficult to separate off.

DE-A 43 19 672 (3) discloses a process for the preparation of -polyisobutylsuccinic anhydrides from polyisobutene and maleic anhydride, in which polyisobutene containing at least 50% of terminal double bonds is reacted with excess maleic anhydride at from 140° to 200° C. The polyisobutylsuccinic anhydrides thus prepared can be further reacted with aliphatic polyamines to give the corresponding succinamides or succinimides. This preparation process for polyisobutylsuccinic anhydrides which usually gives a small bismaleation fraction does however also have disadvantages, in particular the unsatisfactory yields.

Since PIBSA having a low bismaleation fraction is desirable for certain industrial applications, it is an object of the present invention to provide a process for the preparation of polyalkenylsuccinic acid derivatives which gives products with little or no bismaleation fraction with simultaneously high conversions and good product quality.

SUMMARY OF THE INVENTION

We have found that this object is achieved by a process for the preparation of polyalkenylsuccinic acid derivatives by reacting oligo- or polyolefins having a number average molecular weight ($M_N$) of from 500 to 10,000 with maleic acid derivatives of the formula I

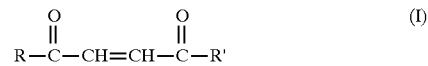

where R and R', independently of one another, are each hydroxyl, lower alkyl or halogen or together are oxygen, at elevated temperatures, wherein effective amounts of free radical acceptors are present in the gas phase and in the liquid phase of the reacting system during the reaction. Particularly suitable free radical acceptors are oxygen or oxygen-containing gases, for example air or other industrial mixtures comprising oxygen and nitrogen. Mixtures of oxygen with other inert gases, for example oxygen/argon mixtures, may also be used.

In a preferred embodiment, the oligo- or polyolefins are treated, before the beginning of the reaction, with oxygen or oxygen-containing gases. For example, air may be passed for a relatively long time, for example one hour, through the olefin, at atmospheric or reduced pressure, residual amounts of water and low-boiling olefin components simultaneously being removed (stripped). Pure inert gas, for example nitrogen, can also be passed through the olefin under the same conditions, it being necessary subsequently to ensure a defined addition of oxygen or oxygen-containing gases. This passage of air or inert gas through the olefin is advantageously effected at elevated temperatures, preferably at from 100° to 250° C., in particular from 140° to 230° C., especially from 160° to 200° C.

An exact specification of the amounts of air or oxygen which are necessary according to the invention or which constitute an optimum range is difficult and tends to depend on the explosion limits of the oxygen/olefin mixtures and the quality of the mixing elements. Experience has shown that good results are obtained with an air or oxygen stream which contains from 1 to 30, particularly from 2 to 20, mg of $O_2$ per minute and per double bond equivalent in the olefin used and is passed through for from 5 to 200, in particular from 15 to 60, minutes.

The following technical procedure for the oxygen treatment has proven advisable in many cases: after stripping with inert gas, for example nitrogen, the reaction apparatus is placed under from 0.1 to 10 bar air so that from 5 to 500, in particular from 20 to 200, ppm of oxygen are present during the maleation. This method can also be combined with the direct passage of oxygen.

During the passage of the oxygen or as a result of forcing in the latter, a certain proportion of the oxygen is adsorbed by the olefin and can thus exert its free radical-accepting effect directly at the double bond. During the reaction of the olefin with the maleic acid derivative I, an equilibrium of the oxygen between gas phase and liquid phase is established, so that the oxygen can act in both phases according to the invention.

In a preferred embodiment, the oligo- or polyolefins used are oligo- or polymers of $C_3$–$C_{12}$-olefins or copolymers of $C_3$–$C_{12}$-olefins with one another or with ethylene.

For the preparation of the polyalkenylsuccinic acid derivatives, oligo- or polyolefins having a number average molecular weight ($M_N$) of from 500 to 10,000, preferably from 800 to 5000, are required. Polyisobutenes of this molecular weight range are prepared, for example, according to U.S. Pat. No. 5,137,980, EP-A 145 235 or U.S. Pat. No. 5,068,490 or according to (1). oligopropenes can preferably be obtained via metallocene catalysis and are described, for example, in EP-A 490 454. oligoolefins of butenes, pentenes, hexenes and decenes and copolymers of olefin mixtures which may also contain up to 70 mol % of ethylene are also of particular interest. The homo- and copolymers of 1-olefins, obtained via metallocene catalysis, are also particularly preferred.

Oligo- or polyolefins having high contents of terminal vinyl or vinylidene double bonds, ie. those which have more than 50%, preferably more than 70%, of terminal double bonds, are preferred. The dispersity D ($M_W/M_N$) of the polymers used is generally from 1.3 to 3, narrow distributions being preferred. For example, polyisobutenes having distributions of less than 2.0 for >$M_N$ 2000 and less than 1.5 for <$M_N$ 1000 are particularly advantageous. The polyolefin should be free of organic and inorganic bases, water, alcohols, ethers, acid and peroxides.

Examples of suitable maleic acid derivatives I are maleic acid itself, corresponding monoalkyl maleates and dialkyl maleates, maleyl dichloride, maleyl dibromide or alkoxycarbonylpropenoyl monochloride or monobromide. Lower alkyl is to be understood in particular as meaning $C_1$–$C_4$-alkyl, in particular methyl or ethyl.

In a preferred embodiment, polyalkenylsuccinic anhydrides are prepared from oligo- or polyolefins and maleic anhydride (MA) by the novel process.

In addition to high purity of the maleic acid derivative I (eg. MA) as a reactant, its acid content is of particular importance and should be as low as possible. Metering of component I in liquid form as a feed during the reaction is advantageous.

The optimum molar ratio of component I (eg. MA) to the olefin is from 1:1 to 5:1, in particular from 1.1:1 to 3:1. A molar excess does not increase the conversions of olefin if free radical reactions are excluded and additionally leads to an undesirable high bismaleation fraction and to problems in carrying out the reaction (in particular to a pressure increase in the reaction container).

The novel reaction of the olefins with the maleic acid derivatives I is carried out, as a rule, in an autoclave at from 140° to 250° C., preferably from 170° to 240° C.

Suitable solvents for the novel reaction are aromatics, such as benzene, toluene, xylenes and other alkylbenzenes, but also ethers, such as tetrahydrofuran (THF), 1,4-dioxane, glycol ethers and oligoglycol ethers, propanediol, butanediol ethers, oligopropanediol ethers, oligobutanediol ethers and mixed ethers. Dimethyldiglycol and diethyldiglycol are particularly suitable for expelling amounts of free MA. However, caution is advisable with regard to the peroxide content in the case of all solvents. This applies in particular to ethers since free radical initiation by ether peroxides prevents the desired reaction. The addition of small amounts of aliphatic solvents which recycle sublimating MA to the reaction mixture is therefore particularly advantageous. A mixture of high-boiling and low-boiling solvents may be advantageous when it is intended to counteract the sublimation during the reaction and working up and to expel residual MA as quantitatively as possible after the reaction.

Optimum product quality in the preferred reaction of PIB with MA is obtained if the MA concentration does not exceed the MA solubility. The solubility is dependent on the reaction temperature, the solvent, the solvent concentration, the molecular weight of the PIB, its dispersity D and the PIB conversion. The product quality increases with increasing PIB conversion. For this reason, an MA feed which is adapted to increasing MA solubility and the reaction rate is advantageous. The optimum duration of addition of equimolar amounts of MA is less than 15 minutes and the feed time for the dimolar excess of MA (at $M_N$ 2400 and 200° C.) is 3 hours. The reaction time is preferably from 2 to 8 hours.

The PIB used is characterized by the viscosity, flashpoint, bromine number and gel permeation chromatography (GPC). PIB standards having a narrow distribution (D less than 1.05) in the $M_N$ range of from 112 to 1,000,000 are used for the GPC, and two packed columns each having a length of 300 mm and a diameter of 7.8 mm are used for the separation. The packing consists of Ultrastyragel having pore sizes of from $10^3$ to $10^5$ Å, the particle size being 5 µm. THF serves as the eluent and solvent, and the flow rate is 1 ml per minute.

The crude PIB/MA product thus obtained is freed from solvents and MA by, for example, distillation under reduced pressure, so that the MA concentration falls below 0.1% by weight. With suitable solvents and solvent concentrations, MA sublimation is not observed even during removal by distillation in glass vessels. In this procedure in glass flasks, however, the PIBSA color deteriorates significantly and becomes darker. The distillation residue (PIBSA) is generally amber-colored, transparent, free of tar and without any opacity to $M_N$=1500. The color intensity increases with increasing conversion and increasing functionalization. Deposits on walls, covers and stirrers are small.

The polyalkenylsuccinic acid derivatives prepared by the novel process can be imidated, amidated or esterified by the conventional method and, in this form, are very useful as fuel and lubricant additives. The imidation or amidation is carried out, for example, by reaction with mono- or polyamines having the usual structure for this purpose, and esterification is effected, for example, by means of dihydric or polyhydric aliphatic alcohols or hydroxyphenols having the usual structure for this purpose. Examples of such imidations, amidations and esterifications are described in (2).

If the polyalkenylsuccinic acid derivatives prepared according to the invention are used in fuels for gasoline engines, they are preferably added in an amount of from 10 to 1000 ppm, in particular from 50 to 500 ppm. Larger amounts must be added in the case of lubricants, and the amounts in this case may be from 0.1 to 10, in particular from 0.5 to 6, % by weight.

If the dispersing properties of polyalkenylsuccinic acid derivatives are to be utilized to a large extent in the fuels for gasoline engines, they may be combined with conventional detergents as additional additives.

In principle, any known suitable product may be used as a detergent component of such a mixture. Such products are described, for example, in J. Falbe and U. Hasserodt, Katalysatoren, Tenside und Mineralöladditive, G. Thieme Verlag Stuttgart, 1978, page 223 et seq., or in K. Owen, Gasoline and Diesel Fuel Additives, John Wiley & Sons, 1989, page 23 et seq.

N-containing detergents, for example compounds which contain amino or amido groups, are preferably used. Polyisobutylamines according to EP-A 244 616 and ethylenediaminetetraacetamides and/or -imides according to EP-A 356 725 are particularly suitable, reference being made to the definition in these publications. The products described there also have the advantage of being chlorine- and chloride-free as a result of their preparation.

Suitable fuels for gasoline engines are leaded and in particular unleaded regular and premium grade gasoline. The gasolines may also contain components other than hydrocarbons, for example alcohols, such as methanol, ethanol or tert-butanol, and ethers, eg. methyl tert-butyl ether. In addition to the reaction products prepared according to the invention, the fuels contain, as a rule, further additives, such as corrosion inhibitors, stabilizers, antioxidants and/or further detergents.

Corrosion inhibitors are generally ammonium salts of organic carboxylic acids, which tend to form films when the starting compounds have the appropriate structure. Amines for reducing the pH are also frequently present in corrosion inhibitors. Heterocyclic aromatics are generally used for prevention of corrosion of nonferrous metals.

The present invention also relates to fuels for gasoline engines and lubricants which contain the polyalkenylsuccinic acid derivatives prepared according to the invention, after additional imidation, amidation or esterification, in the amounts stated in each case.

The products of the reaction of the polyalkenylsuccinic acid derivatives prepared according to the invention to give amides or imides are particularly suitable as lubricant additives if the oligo- or polyolefin on which the alkyl radical is based has an average molecular weight ($M_N$) of from 500 to 10,000 and the number of nitrogen atoms of the polyamine is from 3 to 20. In appropriate fuel additives, the preferred average molecular weight of the parent olefin is from 500 to 2000 and the preferred number of nitrogen atoms of the polyamine is from 2 to 5.

An unexpected increase in the dispersant effect in the case of fuel and lubricant additives is obtained if cocondensation of the (i) stated polyalkenylsuccinic acid derivatives, in particular those prepared according to the invention, with (ii) polycarboxylic acids or polycarboxylic anhydrides or boric acid and (iii) polyamines is carried out, the amounts of the components (ii) and (iii) being chosen so that at least 5, preferably at least 10, in particular at least 30, especially at least 70, mol% of the polyalkenylsuccinic acid derivatives are present as imide or amide structures with (ii) and (iii).

The resulting ashless dispersants comprising (i), (ii) and (iii) have excellent performance characteristics in fuels and lubricants.

The present invention therefore also relates to ashless dispersants which are obtainable by cocondensation of (i) polyalkenylsuccinic acid derivatives of oligo- or polyolefins having a number average molecular weight ($M_N$) of from 500 to 10,000 and maleic acid derivatives of the formula I

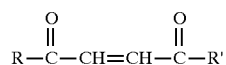
(I)

where R and R', independently of one another, are each hydroxyl, lower alkyl or halogen or together are oxygen, with (ii) boric acid or polycarboxylic acids or polycarboxylic anhydrides selected from the group consisting of low molecular weight aliphatic or aromatic di-, tri- and tetracarboxylic acids which may additionally carry functional groups and polymeric carboxylic acids, with the exception of copolymers of maleic acid or maleic acid derivatives with olefins, and the associated anhydrides and (iii) polyamines, the amounts of the components (ii) and (iii) being chosen so that at least 5 mol % of the polyalkenylsuccinic acid derivatives are present as imide or amide structures with (ii) and (iii).

Ashless dispersants for lubricants, which are obtainable by cocondensation of the stated polyalkenylsuccinic acid derivatives (i) with copolymers of maleic anhydride derivatives, such as MA, with olefins, such as diisobutene, and polyamines, are already known, for example from EP-A 365 288 (4) or U.S. Pat. No. 3,455,827 (5).

Suitable components (ii) in addition to boric acid are both low molecular weight di-, tri- or tetracarboxylic acids having an aliphatic or aromatic structure, which may additionally carry functional groups, such as hydroxyl, amino or carbonyl, and polymeric carboxylic acids and the associated anhydrides. Typical examples of (ii) are trimelitic acid, trimelitic anhydride, pyromelitic acid, pyromelitic anhydride, citric acid, ethylenediaminetetraacetic acid, nitrilotrispropionic acid, acrylic or methacrylic acid homopolymers and copolymers of acrylic or methacrylic acid with maleic acid or maleic acid derivatives.

Examples of suitable components (iii) are diethylenetriamine, triethylenetetramine, tetraethylenepentamine and pentaethylenehexamine. It is essential that these polyamines have at least two amino groups capable of linking to (i) and (ii).

The polyacids (ii) are anchored to the polyalkenylsuccinic acid derivatives (i) via the polyamines (iii) by condensation. The condensation can be effected together by direct method or after precondensation of one or other components. However, anchoring of the polyacids (ii) to (i) is essential and is ensured by the stoichiometry, the choice of amine and the reaction conditions.

The present invention furthermore relates to comb polymers which are obtainable by cocondensation of (a) polyalkenylsuccinic acid derivatives comprising oligo- or polyolefins having a number average molecular weight ($M_N$) of from 500 to 10,000 and maleic acid derivatives of the formula I

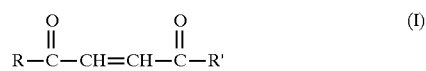
(I)

where R and R', independently of one another, are each hydroxyl, lower alkyl or halogen or together are oxygen, prepared by reacting the oligo- or polyolefins with the maleic acid derivatives in the presence of effective amounts of free radical acceptors in the gas phase and in the liquid phase of the reacting system during the reaction, with (β) polycarboxylic acids or polycarboxylic anhydrides based on copolymers of maleic acid or maleic acid derivatives with olefins, and (γ) polyamines, the amounts of the components (β) and (γ) being chosen so that at least 5 mol % of the polyalkenylsuccinic acid derivatives are present as imide or amide structures with (β) and (γ).

The novel comb polymers are advantageously prepared by cocondensation of the stated components (α), (β) and (γ) by conventional methods. The condensation temperature is preferably from 120° to 200° C.

As described above, the component (α) is prepared in the presence of free radical acceptors, in particular of oxygen or oxygen-containing gases.

The component (β) comprises in particular maleic anhydride/α-olefin copolymers. Examples of suitable (α) olefins are $C_3$–$C_{30}$-α-olefins, in particular linear (straight-chain) and slightly branched $C_6$'$C_{20}$-α-olefins, eg. propene, 1-butene, isobutene, 1-hexene, 1-octene, diisobutene, 1-decene, 1-dodecene, 1-tetradecene, 1-hexadecene, 1-octadecene and 1-eicosene, and oligomers of such olefins, for example 1-decene oligomers. Of particular interest are diisobutene and 1-decene oligomeres. Suitable copolymers of this type have, as a rule, average molecular weights of from 200 to 30,000, in particular from 500 to 10,000, especially from 800 to 5000. If copolymers of MA with 1-decene oligomers are used, molecular weights of from 3000 to 30,000 are particularly advantageous. For the purpose of the present invention, suitable components (β) are also polymers which contain the stated copolymers of maleic acid or maleic acid derivatives with olefins, in particular maleic anhydride/α-olefin copolymers, in substantial amounts, ie. in amounts of at least 20, in particular at least 50, mol %, as polymerized units and additionally contain other monomer components. The polymers of component (β) can be prepared by conventional polymerization methods.

The component (γ) corresponds essentially to the component (iii).

As in the case of the cocondensates of the polyalkenylsuccinic acid derivatives (i), the polyacids (ii) and the polyamines (iii), in the case of the novel comb polymers the polyacids (β) are anchored to the polyalkenylsuccinic acid derivatives (a) via the polyamines (γ) by condensation. The condensation may be effected as a direct cocondensation or after precondensation of one or other components. The anchoring of the polyacids (β) to (α) is, however, essential and is ensured by the stoichiometry, the choice of amine and the reaction conditions.

Preferably, the three components (α), (β) and (γ) are used in a molar ratio of about 1:1:1, ie. essentially every maleic acid unit of (β) (the backbone of the polymer comb) carries, via amide or imide bonding, a tooth comprising a polyamine (γ) at whose other end a polyalkenylsuccinic acid unit (α) is attached. However, it is not absolutely essential for all teeth to carry polyalkenylsuccinic acid units (α), and some teeth in the novel comb polymers may furthermore consist only of polyamines (γ); however, at least 20%, in particular at least 50%, of the teeth in the novel comb polymer should expediently be provided with polyalkylenesuccinic acid units (α).

Also of particular interest among the novel copolymers are those in which some of the maleic acid units of (β) carry ester groups in addition to teeth linked via amide or imide bonds.

The novel comb polymers are very useful as ashless dispersants, in particular in fuels and lubricants, in which they can be used in the abovementioned amounts.

The novel ashless dispersants comprising (i), (ii) and (iii) and the novel comb polymers comprising (α), (β) and (γ) can be tested in the spot test, which is described by A. Schilling in Les Huiles pour Moteurs et le Graissage des Moteurs, volume 1, 1962, pages 89–90. For carrying out the test, 60% strength by weight active substances are prepared by adding mineral oil SN 100. The 60% strength by weight active substances are added to soot dispersions with 3% by weight and the rating is measured.

Characterization of the polyalkenylsuccinic acid derivatives prepared according to the invention In the case of the reaction of PIB with MA, the reaction product is characterized by the MA content, extract, saponification number and PIB conversion.

The MA content of the finished product is very important for the subsequent reaction and the efficiency. The content of free MA is determined in general by water extraction, polyacids and corresponding anhydrides also being determined. In order to correct this error, free MA is determined as follows: the solvent is distilled off at 180° C. and 30 mbar from the PIBSA sample of 200 g, to which 20 g of solvent naphtha has been added, and the acid number of the distillate is determined by titration. The procedure is repeated until the acid number of the distillate is less than 5. The amount of free MA, which generally contains a little MA but also other volatile acids and anhydrides, is then calculated from the amounts of distillate and the associated acid number.

The nonvolatile polyacids or polyanhydrides are determined by extraction of a sample with acetic anhydride (EA). For this purpose, 20 g of reaction product are dissolved in 20 g of heptane and extracted with 28 g of EA. After vigorous shaking, the phase separation is effected overnight and the phases are separated and are worked up by distillation in the same way as the reaction mixture. The saponification number before and after the refinement permits the calculation of the polyacids and polyanhydrides.

In order to determine the saponification number, 1.0 g of product in 25 ml of a 0.5 normal KOH is refluxed with 1:1 ethanol/toluene as a solvent for 10 minutes, the hotplate is removed, the reflux condenser is flushed with 20 ml of methanol and cooling is carried out, followed by back-titration with aqueous HCl.

The content of active substance is determined by conventional HPLC methods and the double bonds of the oligoolefins used are determined by $^1$H-NMR. The ratio of aliphatic to olefinic protons and vinylidene protons is determined here.

The active substance content, molecular weight ($M_N$), extract and saponification number of the refined product permit an exact calculation of the bismaleation fraction, which in the novel process is substantially less than 10%.

PREPARATION EXAMPLES

Example 1

500 g of polyisobutene ($M_N$ 2315, vinylidene double bond content 78%) were initially taken in a 1.4 l stirred autoclave made of stainless steel (V4A) and provided with a disc stirrer (800 rpm) and were heated to 180° C., and reduced pressure of 30 mbar were employed with thorough stirring (500 rpm). This reduced pressure was brought to 100 mbar by passing in nitrogen at the bottom of the autoclave. Under these conditions, stripping was then carried out for 1 hour, small amounts of oligomer passing over in addition to water. Aeration was then carried out and air was blown through for 30 minutes (40 ml/min=9 mg of $O_2$/min) and the autoclave was closed and was heated to 225° C. 21.2 g of MA were then metered in over 5 minutes and a further 32.3 g of MA after 25 minutes. After a total reaction time of 4 hours, the heating was switched off and unconverted MA was distilled off under reduced pressure (30 mbar), after which stripping was effected with 50 ml of cyclohexane and the reacted mixture was analyzed.

The PIBSA thus obtained had a content of free MA of 0.08% by weight, an extract of 0.2% by weight and a saponification number of the refined product of 43, a saponification number of the crude product of 44, an active substance content of 85% and a relative bismaleation of 5%. The refined product obtained from the EA extraction was a clear brown liquid and the crude product was slightly cloudy and amber-colored.

Example 2

100 g of the succinic anhydride according to Example 1 were mixed with 10 g of a diisobutene/MA copolymer having a molecular weight ($M_N$) of 400 and condensed at 180° C. with 20 g of pentaethylenehexamine. For this purpose, stripping was effected for 4 hours with 20 l/h of nitrogen. The condensation product then had an acid number of 0.8 and was compared in the spot test with commercial, ashless dispersants. A rating of 700 was obtained, the standard Oloa® 4373 (commercial reaction product of PIBSA and pentaethylenehexamine) giving 620.

Example 3

100 g of the succinic anhydride according to Example 1 were mixed with 8 g of ethylenediaminetetraacetic acid and condensed at 180° C. with 20 g of pentaethylenehexamine as in Example 2. The acid number after condensation was 0.5. The rating in the spot test was completely comparable at 690.

Examples 4 to 8

These examples were carried out similarly to Example 1, except that nitrogen or air was passed in after stripping in order to establish different oxygen contents in the gas and liquid phase. The boundary conditions and results are summarized in the table below.

| Example No. | Molar ratio MA:PIB | $O_2$/PIB [ppm] | Active substance content [%] | Bismaleation [%] |
|---|---|---|---|---|
| 4 | 1.2:1 | 35 | 79 | 8 |
| 5 | 1.2:1 | 70 | 81 | 3 |
| 6 | 2:1 | 70 | 80 | 6 |
| 7 | 2:1 | 175 | 78 | 2 |
| 8 | 3:1 | 175 | 79 | 10 |

Examples 9 to 11

These examples include a direct comparison of the maleation at relatively low temperatures according to (3) with the novel aleation in the presence of air as free radical acceptor.

The two processes lead to similar products, but the advantage of the air method is the substantially higher functionalization yield in conjunction with substantially shorter reaction times, due to higher maleation temperatures without bismaleation. For this reason, the air method has in particular economic advantages in the form of increased plant capacity.

Examples 9 and 10 from (3) show that, in spite of the establishment of excellent inert conditions by means of solvents, reliable monomaleation is possible only at below 200° C., the yields suffering. As a result of the presence of atmospheric oxygen as required by the present invention, the temperature can be increased to 225° C. without significant bismaleation and an 89% PIB conversion (cf. Example 11) can be obtained with the same reaction time and at lower MA concentration.

| | Examples | Molar MA excess [mol] | Temperature [°C.] | Relative bismaleation [%] | PIB conversion [%] | Reaction time [h] |
|---|---|---|---|---|---|---|
| 9 | Example 5 from (3) for comparison | 0.55 | 195 | 3 | 83 | 2 + 6 |
| 10 | Comparative example similar to (3) | 0.55 | 225 | 31 | 86 | 0.5 + 3 |
| 11 | Novel example | 0.20 | 225 | 5 | 89 | 0.5 + 3 |

Example 11 was carried out similarly to Example 10, the comparative example similar to (3). The only difference here was gassing of the PIB ($M_N$ 1000) for half an hour with air before the establishment of inert conditions with high-boiling aromatics boiling within the range from 150° to 180° C. according to Example 1 (cf. above). The reactor used was 5 l V2A stainless steel stirred kettle having a pan stirrer.

Example 12 (Preparation of a Comb Polymer)

The PIBSA-containing product from Example 11 (cf. above) was reacted in a molar ratio of 1:1.1 with triethylenetetramine at 180° C., ie. one mol of triethylenetetramine per mol of succinic anhydride. After 15 minutes, reduced pressure was applied by means of an oil pump and residual amounts of free triethylenetetramine were expelled by means of high-boiling aromatics boiling within the range from 150° to 180° C.

Thereafter, a 50% strength by weight solution in said aromatic was prepared and condensation was effected with 1 anhydride equivalent of an MA/diisobutene copolymer obtained by bulk polymerization and having an $M_N$ 800 and a saponification number of 450. This gave a polymer comb whose PIB teeth are fixed via bissuccinimides of triethylenetetramine:

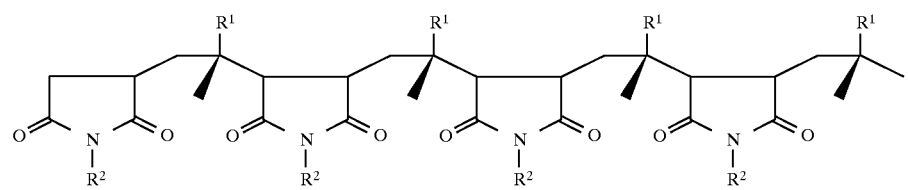

$R^1$ = 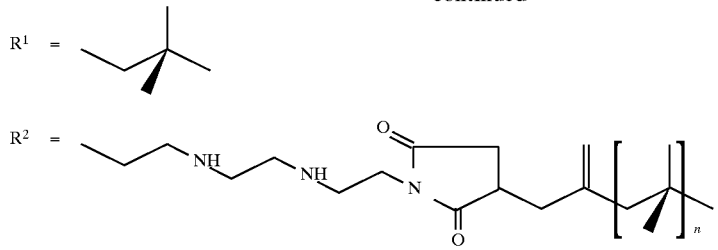

$R^2$ =

This polyimide had an acid number of less than 1. The dispersing action was then tested in a subsequent spot test (cf. above).

3% by weight of active substance were added to the carbon black dispersion, and the rating was measured. A value of 680 was obtained at room temperature and one of 660 at 250° C.

The viscosity of an SAE API 10W-30 engine oil, containing 6% by weight of the active substance described but no VI improver, was 11.2 mM²/s at 100° C. and its low temperature value at −20° C. in the cold cranking simulator (CCS) was 3050 mpa·s.

Comparative Example 9 (cf. above) was reacted similarly to Example 12 with PIBSA from Example 11 and led to an active substance having a rating in the carbon black dispersion (3% strength by weight) of 610 at room temperature and 605 at 250° C. and to a viscosity of 9.9 mM²/s in the SAE API 10W-30 engine oil at 100° C. and a CCS value of 3100 mpa·s at −20° C.

We claim:

1. A process for the preparation of polyalkenylsuccinic acid derivatives by reacting oligo- or polyolefins having a number average molecular weight ($M_N$) of from 500 to 10,000 with maleic acid derivatives of the formula I

where R and R', independently of one another, are each hydroxyl, lower alkoxy or halogen or together are oxygen at elevated temperatures, wherein oxygen or an oxygen containing gas is passed through the oligo- or polyolefins as a free radical acceptor before the reaction with the derivative of formula I in an amount of from 1 to 30 mg of $O_2$ per minute per double bond equivalent in the olefin for from 5 to 200 minutes at 160° to 250° C. or wherein the oxygen treatment at 160° to 250° C. takes place under a pressure of from 0.1 to 10 bar air so that 5 to 500 ppm of $O_2$ are present during the reaction of the oligo- or polyolefins with the maleic and derivative (I).

2. The process of claim 1, wherein oxygen or an oxygen-containing gas is passed through the oligo- or polyolefins as a free radical acceptor.

3. The process of claim 1, in which the oligo- or polyolefins are oligo- or polymers of $C_3$–$C_{12}$-olefins or copolymers of $C_3$–$C_{12}$-olefins with one another or with ethylene.

4. The process of claim 1, wherein I is maleic anhydride.

* * * * *

UNITED STATES PATENT AND TRADEMARK OFFICE
CERTIFICATE OF CORRECTION

PATENT NO.: 5,883,196

DATED: March 16, 1999

INVENTOR(S): RATH et al.

It is certified that error appears in the above-identified patent and that said Letters Patent is hereby corrected as shown below:

On the title page, item [30] insert:

Foreign Application Priority Data
May 24, 1995   [DE]   Germany ................ 195 19 042.4--.

Signed and Sealed this

Twenty-seventh Day of July, 1999

Attest:

Q. TODD DICKINSON

*Attesting Officer*    Acting Commissioner of Patents and Trademarks